(12) United States Patent
Nathan et al.

(10) Patent No.: US 7,618,748 B2
(45) Date of Patent: Nov. 17, 2009

(54) THREE-DIMENSIONAL MICROBATTERY

(75) Inventors: Menachem Nathan, Tel Aviv (IL); Emanuel Peled, Even Yehuda (IL); Diana Golodnitsky, Rishon Lezion (IL); Ela Strauss, Bat Yam (IL); Vladimir Yufit, Ashdad (IL); Tania Ripenbein, Rishon Lezion (IL); Inna Schechtman, Herzliya (IL); Svetlana Menkin, Petah Tikva (IL)

(73) Assignee: Tel Aviv University Future Technology Development L.P., Tel Aviv (IL)

( * ) Notice: Subject to any disclaimer, the term of this patent is extended or adjusted under 35 U.S.C. 154(b) by 660 days.

(21) Appl. No.: 11/374,469

(22) Filed: Mar. 13, 2006

(65) Prior Publication Data

US 2007/0212603 A1    Sep. 13, 2007

(51) Int. Cl.
*H01M 2/02* (2006.01)
*H01M 4/66* (2006.01)

(52) U.S. Cl. .................. 429/238; 429/304; 429/218.1; 429/231.95; 429/234; 429/245; 429/129; 429/164; 429/149; 29/623.5

(58) Field of Classification Search .......... 429/149, 429/304, 218.1, 231.95, 234, 238, 245, 129, 429/164; 29/623.5
See application file for complete search history.

(56) References Cited

U.S. PATENT DOCUMENTS

| | | | |
|---|---|---|---|
| 5,162,178 A | 11/1992 | Ohsawa et al. | |
| 5,338,625 A | 8/1994 | Bates et al. | |
| 5,498,312 A | 3/1996 | Laermer et al. | |
| 5,567,210 A | 10/1996 | Bates et al. | |
| 5,654,114 A * | 8/1997 | Kubota et al. | ............... 429/338 |
| 6,197,450 B1 * | 3/2001 | Nathan et al. | ............... 429/236 |
| 6,214,161 B1 | 4/2001 | Becker et al. | |
| 6,260,388 B1 | 7/2001 | Borrelli et al. | |
| 6,270,714 B1 | 8/2001 | Azran et al. | |
| 6,300,709 B1 | 10/2001 | DeVoe et al. | |
| 6,303,512 B1 | 10/2001 | Laermer et al. | |
| 7,204,862 B1 * | 4/2007 | Zhang | ....................... 29/623.1 |

FOREIGN PATENT DOCUMENTS

| | | |
|---|---|---|
| EP | 0 450 848 | 10/1991 |
| EP | 1 134 821 | 9/2001 |
| FR | 2 550 015 | 1/1985 |

(Continued)

OTHER PUBLICATIONS

J.J. Devadasan, et al., Journal of Crystal Growth 226 (2001) 67-72.

(Continued)

*Primary Examiner*—Patrick Ryan
*Assistant Examiner*—Amanda Barrow
(74) *Attorney, Agent, or Firm*—Ladas and Parry LLP (57) ABSTRACT

An electrical energy storage device includes a substrate having an outer surface and having a plurality of cavities communicating with the outer surface. The cavities have interior cavity surfaces. A first electrode layer is deposited at least over the interior cavity surfaces. An electrolyte separator layer is formed over the first electrode layer so as to fill the cavities and to extend over the outer surface of the planar substrate. A second electrode layer is formed over the electrolyte separator layer on the outer surface of the planar substrate.

28 Claims, 4 Drawing Sheets

FOREIGN PATENT DOCUMENTS

| | | |
|---|---|---|
| WO | WO 2005/027245 | 3/2005 |
| WO | WO 2005/036711 | 4/2005 |
| WO | WO 2005/101973 | 11/2005 |

OTHER PUBLICATIONS

P. Fragnaud, et al., Journal of Power Sources 54 (1995) 362-366.

I. Martin-Litas, et al., Journal of Power Sources 97-98 (2001), 545-547.

Long, et al., "Three-dimensional battery architectures", Chemical Review, vol. 10, No. 104, Oct. 2004.

Golodnitsky, et al., "Progress in three-dimensional (3D) Li-Ion microbatteries", The 15$^{th}$ International Conference on Solid-State Ionics (SSI-15), Baden-Baden, Germany, Jul. 17-22, 2005.

Albu-Yaron, et al., "Influence of the electrochemical deposition parameters on the microstructure of MoS2 thin films", Thin Solid Films, Elsevier-Sequoia S.A. Lausanne, CH, vol. 361-362, No. 1, Feb. 2000, pp. 223-228.

U.S. Appl. No. 60/418,718.

Y. Miki, et al., Journal of Power Sources 54 (1995) 508-510.

Norma R. de Tacconi, et al., J. Phys. Chem. (1996), 100, 18234-18239.

E.A. Ponomarev, et al.. Thin Solid Films 280 (1996), 86-89.

\* cited by examiner

THREE-DIMENSIONAL MICROBATTERY

FIELD OF THE INVENTION

The present invention relates generally to electrical energy sources, and particularly to three-dimensional (3-D) microbatteries.

BACKGROUND OF THE INVENTION

Several 3-D microbattery configurations and methods for producing such batteries are known in the art. For example, U.S. Pat. No. 6,197,450, whose disclosure is incorporated herein by reference, describes thin-film micro-electrochemical energy storage cells (MEESC) such as microbatteries and double-layer capacitors (DLC). The energy storage cells comprise two thin layer electrodes, an intermediate thin layer of a solid electrolyte and an optional fourth thin current collector layer. The layers are deposited in sequence on a surface of a substrate. The substrate comprises multiple through cavities of arbitrary shape, with high aspect ratio, which increase the total electrode area per volume ratio.

Other 3-D microbattery configurations are described by Long et al., in "Three-Dimensional Battery Architectures," Chemical Review, volume 10, number 104, October, 2004, pages 4463-4492, which is incorporated herein by reference.

PCT Patent Application PCT/IL2004/000945, filed Oct. 14, 2004, which is incorporated herein by reference, describes 3-D storage cells, such as 3-D microbatteries, produced by forming multiple thin film layers on a microchannel plate (MCP) structure. PCT Patent Application PCT/IL2005/000414, filed Apr. 20, 2005, which is incorporated herein by reference, describes 3-D microbatteries comprising two sets of high aspect-ratio micro-containers formed in a substrate. The micro-containers are filled with appropriate anode and cathode materials and used as the electrodes of the microbattery. The anodes and cathodes are arranged in an interlaced pattern and are separated by walls of substrate material. The walls of the substrate that separate the micro-containers are processed to enhance their ion-conductivity and electrical insulation.

SUMMARY OF THE INVENTION

Embodiments of the present invention provide improved miniature three-dimensional (3-D) electrical energy storage devices, such as 3-D microbatteries, and methods for fabricating such cells.

In some known 3-D microbattery configurations, the energy cell is fabricated in a substrate having multiple miniature cavities formed therein. The cathode, separator layer and anode are formed in the 3-D structure. In particular, the different layers are inserted into the interior of the cavities.

Unlike these known configurations, in embodiments of the present invention only one of the electrodes, the electrolyte separator layer and, optionally, one current collector are formed inside the cavities. The electrolyte separator layer fills the interior of the cavities and extends over the outer surface of the substrate. The second electrode is attached to the electrolyte separator layer on the surface of the substrate. Because only some of the layers need to be formed in the interior of the cavities, the 3-D cell configurations described herein are simpler to fabricate using conventional manufacturing processes.

Moreover, the configurations described below enable the deposition of thicker cathodes in comparison to the known configurations, thus providing a significant increase of energy capacity and density. Several exemplary 3-D microbatteries fabricated using the disclosed methods are described hereinbelow.

There is therefore provided, in accordance with an embodiment of the present invention, an electrical energy storage device, including:

a substrate having an outer surface and having a plurality of cavities communicating with the outer surface, the cavities having interior cavity surfaces;

a first electrode layer deposited at least over the interior cavity surfaces;

an electrolyte separator layer formed over the first electrode layer so as to fill the cavities and to extend over the outer surface of the planar substrate; and a second electrode layer formed over the electrolyte separator layer on the outer surface of the planar substrate.

In an embodiment, the substrate has at least one of a planar and a spherical shape. The substrate may include at least one of a perforated plate and a microchannel plate (MCP). In another embodiment, the substrate has two opposite outer surfaces, the cavities include through cavities communicating with the two outer surfaces, the electrolyte separator layer extends over the two outer surfaces, and the second electrode layer is formed over the electrolyte separator layer on the two opposite outer surfaces. Additionally or alternatively, the substrate may include at least one of a semiconductor, a glass, a plastic, a metal, an alloy, carbon and a composite material. In yet another embodiment, a ratio of a height of the cavities divided by a width of the cavities is greater than unity.

In an embodiment, the device further includes a first hollow current collector layer coating at least part of the substrate and deposited between the interior cavity surfaces of the substrate and the first electrode layer. Additionally or alternatively, the device may include a second current collector layer formed over the second electrode layer.

In another embodiment, one of the first and second electrode layers includes a cathode of the device, and the other of the first and second electrode layer includes an anode of the device. In an embodiment, the cathode includes at least one of molybdenum oxysulfide ($MoS_2$), FeS, $FeS_2$, $WS_2$, $LiCoO_2$, $LiNiO_2$, $LiMn_2O_4$, CuS, $CuS_2$, $TiS_2$, $V_2O_5$, $V_3O_8$, $Li_{1+x}Mn_{2-y}O_4$, $MoO_2$, $MoO_3$, CoO and $Fe_xMo_ySO$. In still another embodiment, the cathode includes a composite cathode having a polymer added thereto. In yet another embodiment, the anode includes at least one of graphite, an alkali metal and an alkali metal alloy. In an embodiment, the electrolyte separator layer includes at least one of a hybrid polymer electrolyte (HPE) membrane, a gel electrolyte, a solid ceramic electrolyte and a solid polymer electrolyte.

There is also provided, in accordance with an embodiment of the present invention, a method for constructing an electrical energy storage device, including:

providing a substrate having an outer surface and having a plurality of cavities communicating with the outer surface, the cavities having interior cavity surfaces;

depositing a first electrode layer at least over the interior cavity surfaces;

forming an electrolyte separator layer over the first electrode layer so as to fill the cavities and to extend over the outer surface of the planar substrate; and forming a second electrode layer over the electrolyte separator layer on the outer surface of the planar substrate.

In an embodiment, depositing the first electrode layer includes applying at last one of an electrochemical deposition process, an electroless deposition process and a chemical vapor deposition process. Additionally or alternatively, forming the electrolyte separator layer includes inserting the electrolyte layer into the cavities using at least one of a spin-coating process, a vacuum-assisted pulling process, a pasting process, a pressure-filling process and a casting process.

The present invention will be more fully understood from the following detailed description of the embodiments thereof, taken together with the drawings in which:

DETAILED DESCRIPTION OF EMBODIMENTS

Microbattery Structure and Fabrication Method

Figure 1:
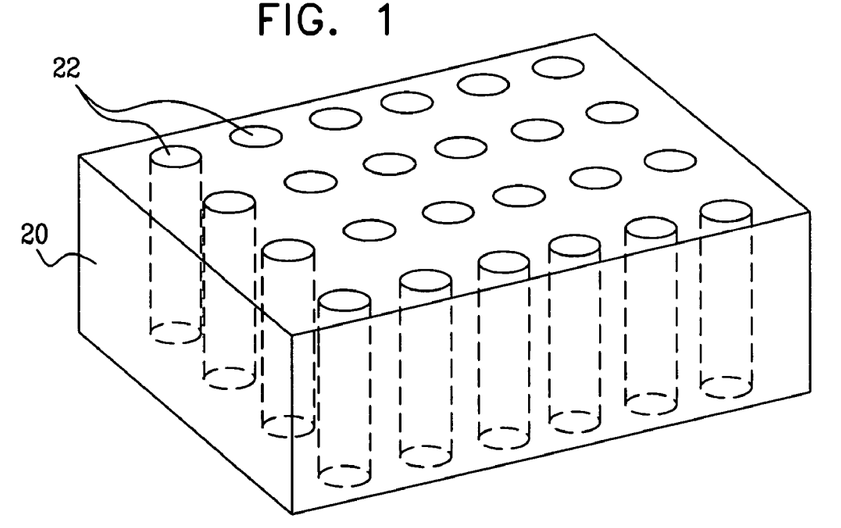
FIG. 1 is a pictorial, schematic illustration of a perforated substrate, in accordance with an embodiment of the present invention.

FIG. 1 is a pictorial, schematic illustration of a perforated substrate 20 used a base for constructing a microbattery 10, in accordance with an embodiment of the present invention. In the exemplary embodiment of FIG. 1, substrate 20 comprises a planar structure having two opposite faces, although substrates having other shapes and forms, such as spherical substrates, can also be used. Multiple through cavities 22 perforate substrate 20, penetrating the entire thickness of the substrate from one face to the other.

In some embodiments, substrate 20 comprises a wafer or other plate in which cavities 22 are formed using a suitable electrochemical etching or lithography process. Exemplary methods for producing cavities are described in PCT Patent Application PCT/IL2005/000414 cited above, which is assigned to the assignee of the present patent application. The substrate material may comprise a semiconductor such as silicon, a plastic, a metal, an alloy, a carbon, a composite material or any other suitable material.

Alternatively, substrate 20 may comprise a microchannel plate (MCP) structure, i.e., a two-dimensional array of very-small diameter tubes, which are fused together and sliced to form a thin plate. MCPs are most commonly made of glass, but can also be made of other materials, such as carbon fibers. MCPs are commercially available from a number of different sources, such as Del Mar Ventures (San Diego, Calif.) and Burle Electro-Optics, Inc. (Sturbridge, Mass.). Methods for producing MCPs are described, for example, in U.S. Pat. Nos. 6,300,709, 6,260,388 and 6,270,714, whose disclosures are incorporated herein by reference. Some aspects of producing microbatteries using MCPs are described in PCT Patent Application PCT/IL2004/000945 cited above, which is assigned to the assignee of the present patent application.

In alternative embodiments, substrate 20 may comprise a wafer in which cavities 22 are formed using a suitable electrochemical etching or lithography process. Exemplary methods for producing cavities are described in PCT Patent Application PCT/IL2005/000414 cited above, which is assigned to the assignee of the present patent application.

The thickness of substrate 20 (and thus the height of cavities 22) is preferably in the range of 100-800 microns, although the methods described below can be used to fabricate microbatteries in substrates of any thickness. The characteristic width or diameter of the cavities is typically on the order of several tens of microns. Typically, the cavities have an aspect ratio (i.e., a height-to-width ratio) greater than one. The cavities are separated by substrate walls having a thickness that may typically vary from 1 micron and up to several tens of microns. The total number of micro-containers in a typical microbattery can vary from several hundreds to several tens of thousands, depending on the cavity diameter, the wall thickness and the electrical specifications of the battery. Typically, the cavities have a high aspect ratio, i.e., their height is significantly larger than their diameter. Although the examples below show cylindrical cavities having round cross-sections, other shapes and cross-sections can also be used. In some embodiments, the cavities may not necessarily comprise through cavities, i.e., the cavities may penetrate only one of the surfaces of the substrate.

Figure 2:
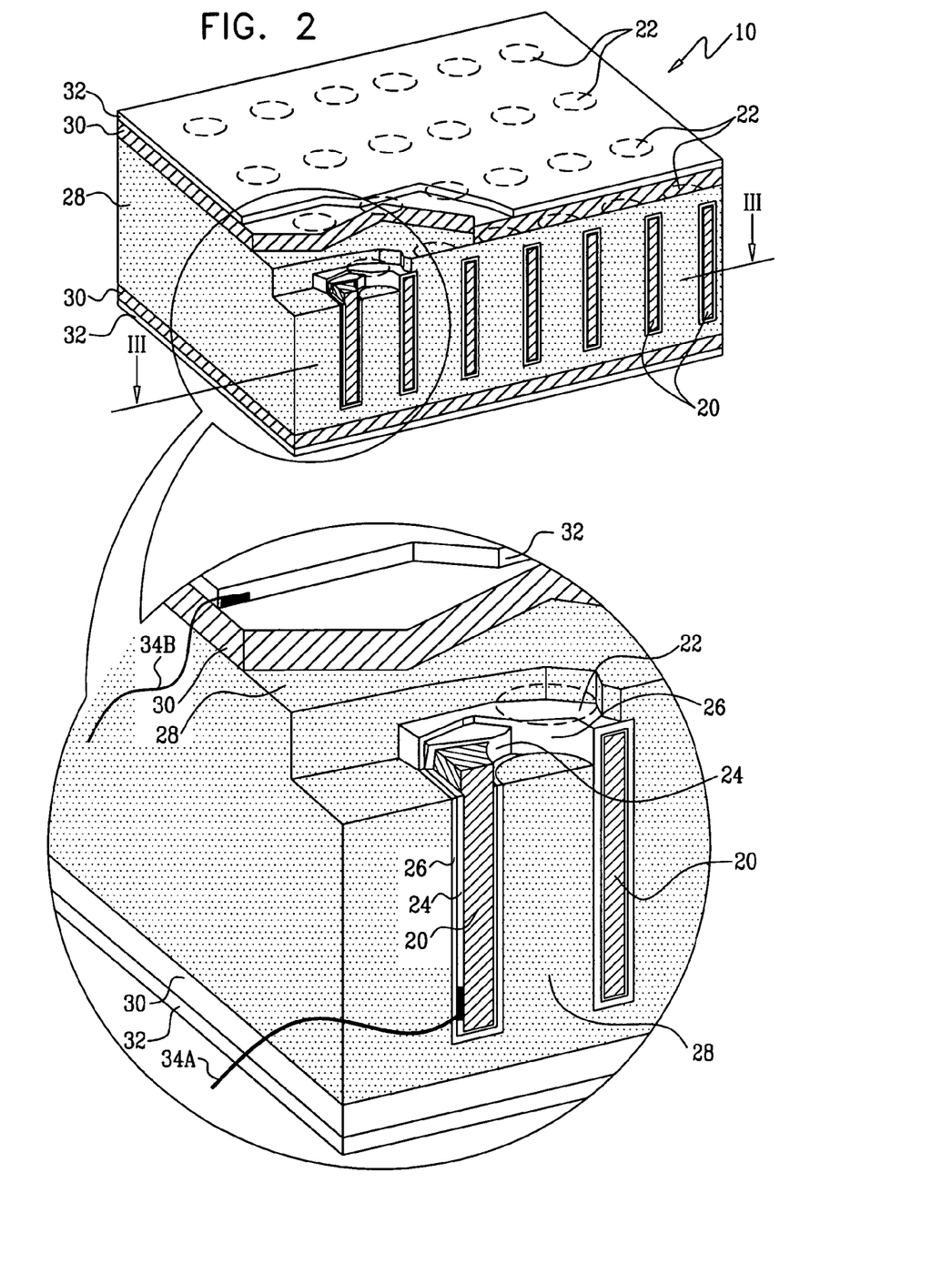
FIG. 2 is a pictorial, schematic illustration of a microbattery, in accordance with an embodiment of the present invention.

FIG. 2 is a schematic, cutaway illustration of microbattery 10, in accordance with an embodiment of the present invention. In some embodiments, a first current collector layer 24 is formed over the surface area of substrate 20. Layer 24 typically comprises a metallic layer, which is deposited over substrate 20 using any suitable thin-film deposition process known in the art. Typically, layer 24 forms a hollow structure or crust that coats the entire surface area of the perforated substrate, both internally and externally to cavities 22. In particular, layer 24 coats the interior surfaces of cavities 22. Exemplary microbatteries in which layer 24 comprises a 2-4 micron nickel layer are described below. Alternatively, thinner (e.g., 1 micron) or thicker current collector layers can also be used.

Current collector layer 24 forms one of the terminals of the microbattery. In alternative embodiments, for example when substrate 20 comprises an electrically-conductive material, current collector 24 can be omitted. In some cases, a carbon or metallic substrate may be sufficiently conductive so as to obviate the use of layer 24. For example, a perforated metal sheet, a carbon (e.g., graphite) mesh or a highly doped silicon wafer may serve as electrically-conductive substrates.

A cathode layer 26 is formed over the first current collector layer (or directly over the perforated substrate, if the first current collector layer is omitted). Layer 26 substantially coats the entire surface area of the first current collector, both internally and externally to cavities 22. When first current collector layer 24 is omitted, the cathode layer coats the substrate, and the substrate itself forms one of the terminals of microbattery 10.

In the examples described below, layer 26 comprises molybdenum oxysulfide ($MoS_2$). Alternative cathode materials that may be used are described in U.S. Pat. No. 6,197,450, and in PCT Patent Applications PCT/IL2004/000945 and PCT/IL2005/000414, cited above. For example, alternative cathode materials may comprise $FeS$, $FeS_2$, $WS_2$, $LiCoO_2$, $LiNiO_2$, $LiMn_2O_4$, $CuS$, $CuS_2$, $TiS_2$, $V_2O_5$, $V_3O_8$, $Li_{1+x}Mn_{2-y}O_4$, $MoO_2$, $MoO_3$, $CoO$ and $Fe_xMo_ySO$.

In some embodiments, an additional polymer is added to the cathode material to form a thicker, composite cathode. Composite cathodes are described, for example, by Golodnitsky et al. in "Progress in Three-Dimensional (3D) Li-Ion Microbatteries," The 15th International Conference on Solid State Ionics (SSI-15), Baden-Baden, Germany, Jul. 17-22, 2005, which is incorporated herein by reference. Composite negative electrode configurations used in secondary batteries are described in U.S. Pat. No. 5,162,178, whose disclosure is incorporated herein by reference.

The thickness of composite cathodes used in the microbattery configurations described herein may vary from approximately 20 nm to over 10 microns, whereas the thickness of a pristine cathode may typically vary between 10 nm and 2 microns. A thicker cathode typically increases the energy density of the battery. Exemplary battery configurations comprising composite cathodes and associated energy density (capacity) test results are described below. The microbattery configurations described herein are particularly suitable for deploying composite cathodes because fewer battery layers are applied in the interior of the cavities. Thus, a larger cavity volume is available to support a thicker cathode.

The cathode layer may be formed using an electrochemical deposition process or using any other suitable method, such as electroless deposition and chemical vapor deposition. The characteristic thickness of the cathode layer is in the range of 0.2 to 5 microns, although other thicknesses can also be used. Typically, layer 26 is formed so as to coat the entire surface of the first current collector or substrate.

An electrolyte separator layer is applied over cathode layer 26 to form the separator layer of the microbattery, as is known in the art. In some embodiments, the electrolyte separator layer comprises an ion-conducting electrolyte membrane 28. Membrane 28 is disposed so as to coat the cathode layer and fill the remaining interior volume of cavities 22. Membrane 28 extends beyond the outer surface (or surfaces) of substrate 20. Typically, such as in the example of FIG. 2, the membrane extends beyond both opposite faces of the substrate and has two opposite planar outer surfaces. As can be appreciated, membrane 28 is in contact with cathode layer 26 across a large surface area, both in the interior of the cathode-plated cavities and over the external faces of the cathode-plated substrate.

In the examples described below, membrane 28 comprises a hybrid polymer electrolyte (HPE). Alternatively, membrane 28 may comprise a ceramic or other solid electrolyte, a polymer electrolyte or a gel electrolyte. Typically, membrane 28 is electrically insulating and ion-conducting. The membrane material can be inserted into the cavities using any suitable process known in the art, such as spin-coating, vacuum-assisted pulling, pasting, pressure-filling and casting processes.

Note that substrate 20, cathode layer 26 and electrolyte membrane 28 should be chosen so as to be chemically compatible with one another, i.e., not react with one another or cause corrosion.

An anode layer 30 is formed on or otherwise attached to the outer surface or surfaces of the ion-conducting membrane. In the examples described below, anode layer 30 comprises graphite. Alternatively, the anode may comprise any other suitable material, such as various lithium alloys known to reversibly intercalate with lithium and comprises one or more elements selected from: Si, Sn, Sb, Al, Mg, Cu, Ni and Co. The anode may alternatively comprise any other suitable alkali metal or alkali metal alloy.

The anode layer comprises a substantially flat layer or film. The anode may be deposited onto the outer surface of the membrane using a thin- or thick-film deposition process. Alternatively, the anode may comprise a thin foil made of anode material and attached to the surface of the membrane. The anode layer may either be attached to one or both outer surfaces of membrane 28.

A second current collector layer 32 is optionally attached to the anode layer and connected to another terminal of battery 10. In embodiments in which the anode comprises an electrically-conductive material (such as graphite), the second current collector may be omitted and the battery terminal connected directly to the anode. Unlike some known 3-D microbattery configurations, the anode and second current collector are substantially flat, 2-D layers that do not penetrate into cavities 22.

Various alternative material compositions of the anode, cathode and electrolyte layers, as well as suitable processes for disposing these layers, are also described in the background references cited above.

The two terminals of the microbattery, denoted 34A and 34B, are connected to the first and second current collector layers, respectively. Terminal 34A is led through a suitable opening in the microbattery structure and connected to layer 24. Terminal 34B is connected to layer 32. As noted above, in embodiments in which layer 24 is omitted, terminal 34A is connected directly to substrate 20. Similarly, when layer 32 is omitted, terminal 34B is connected directly to anode layer 30.

Figure 3:
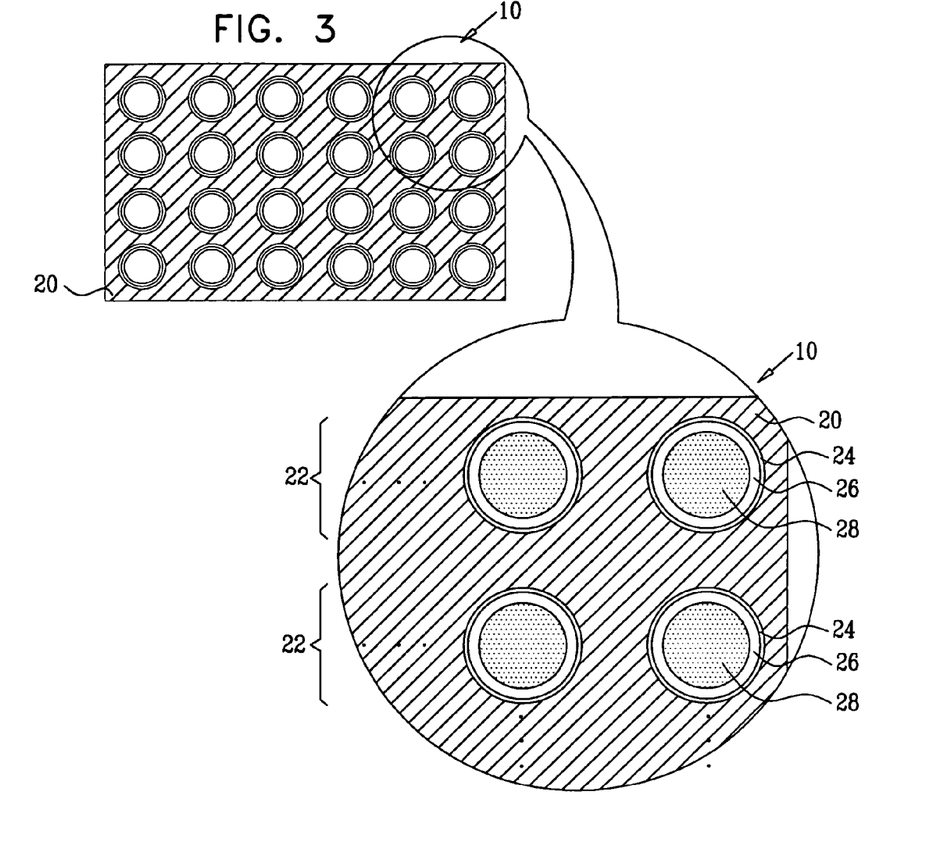
FIG. 3 is a schematic top view cross-section of a microbattery, in accordance with an embodiment of the present invention.

FIG. 3 is a schematic top view cross-section of microbattery 10 of FIG. 2 above, in accordance with an embodiment of the present invention. The figure shows a top view cross section in the horizontal plane marked III in FIG. 2 above, showing substrate 20 with cavities 22. The interior surfaces of the cavities are plated with first current collector layer 24, then with cathode layer 26. The remaining volume inside the cavities is filled with membrane 28.

In comparison to some known 3-D microbattery configurations, the structure of microbattery 10 shown in FIGS. 2 and 3 is simpler to fabricate. Because the anode layer is applied externally to the cavities, the ion-conducting membrane can be allowed to fill the entire remaining volume of the cavities, without the need to accommodate an additional anode layer. Thus, the membrane can be applied using various filling, pasting and/or casting methods, and not necessarily using conformal deposition processes. Moreover, the cathode layer can be made thicker, thus increasing the energy capacity of the battery.

Although in the exemplary embodiment of FIGS. 2 and 3 the substrate is coated with the cathode layer and the anode layer is an external flat layer, the role of the two electrodes can be reversed. In other words, in alternative embodiments, the microbattery may comprise an anode layer that coats the substrate, and a flat external cathode.

Figure 4:
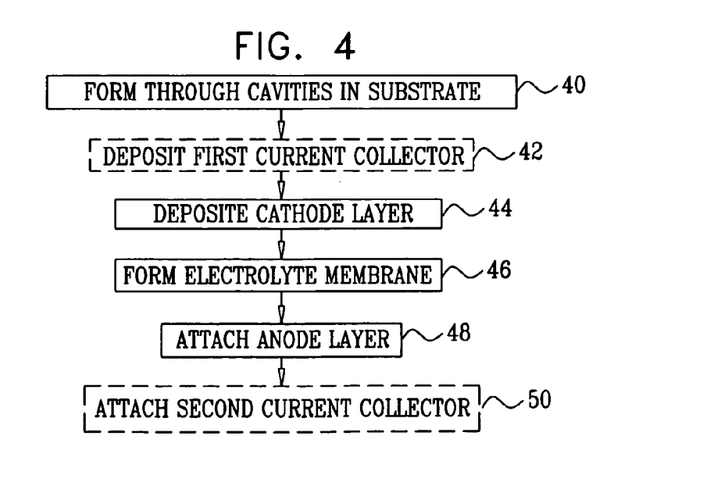
FIG. 4 is a flow chart that schematically illustrates a method for fabricating a microbattery, in accordance with an embodiment of the present invention.

FIG. 4 is a flow chart that schematically illustrates a method for fabricating microbattery 10, in accordance with an embodiment of the present invention. Several examples of specific microbatteries fabricated using the method of FIG. 4 are described further below. The method begins by producing or otherwise obtaining a perforated substrate 20, at a substrate provisioning step 40. In some embodiments, the perforated substrate may be produced as part of the microbattery fabrication process. Alternatively, a suitable perforated substrate may be provided a-priori.

Optionally, first current collector layer 24 is deposited on the substrate, at a first current collector forming step 42. Then, the first electrode layer (in the present example a cathode layer) is formed, coating the first current collector layer, at a first electrode forming step 44. When the first current collector is omitted, the first electrode layer coats the substrate.

Membrane 28 is then applied, at a membrane forming step 46. As described above, the membrane material fills the remaining volume of cavities 22 and extends beyond the 3-D structure of the substrate, forming one or two outer surfaces. A second electrode layer (in the present example an anode layer) is then applied to at least one of the outer surfaces of the membrane, at a second electrode forming step 48. Optionally, second current collector layer 32 is applied to the anode layer, at a second current collector forming step 50. Terminals can then be connected to the microbattery, and the assembled microbattery can be packaged and/or sealed using any suitable means.

Exemplary Microbatteries

The following examples illustrate several possible 3-D microbattery implementations that use the disclosed structures and methods.

Example 1

A 3-D microbattery is assembled in accordance with the configuration of FIGS. 1-3 above. The microbattery comprises a $MoS_2$ cathode, a hybrid polymer electrolyte (HPE) membrane and a lithium-ion graphite anode. A nickel layer is used as the cathode current collector.

The substrate used in the present example comprises a round soda-lime MCP substrate (produced by BURLE Electro-Optics, Inc., part number C13S05M50). The substrate has an external diameter of 13 mm, a thickness of 0.5 mm, and has multiple round through cavities, 50 micron in diameter. The MCP substrate is made of soda-lime glass having the following composition (w/w %): $SiO_2$ (72.8), $Na_2O$ (13.7), CaO (8.8), MgO (4.0), $Fe_2O_3$ (0.12), $Al_2O_3$ (0.1).

The substrate is initially treated to enhance the adhesion of the nickel current collector. The treatment comprises sequential soaking and degreasing in a detergent solution and ethanol, performed in an ultrasonic bath at room temperature. The substrate is subsequently immersed in boiling cyclohexane and concentrated (98%) sulfuric acid. The degreased surface is etched in a 1:4 mixture of hydrofluoric (40%) and sulfuric (98%) acids.

An electroless method, known in the art to provide conformal coating, is used to deposit the nickel current collector on all exposed surfaces of the MCP substrate. The electroless deposition of nickel comprises several sequential repetitions of sensitization in a $SnCl_2$, $HCl:H_2O$ solution, activation in a $PdCl_2$, $HCl:H_2O$ solution and nickel reduction. The activated nickel-plated substrate is immersed in an alkaline Ni-electroless bath with trisodium citrate as a complexant and sodium hypophosphite as a reduction component. The autocatalytic process is carried out at 65-70° C. for 5-15 minutes. The thickness of the deposited nickel layer varies according to the deposition time. For example, 15 minutes of deposition produce a layer thickness of approximately 2 microns.

The composition of the electroless solution is as follows: nickel sulfamate: 0.100M, sodium citrate: 0.125M, sodium acetate: 0.100M, sodium hypophosphite: 0.314M, thiourea: 0.1 md/L, sodium dodecylsulfate: 10 mg/L, pH: 9. The resulting current collector layer is conformal and highly adherent, completely coating the cavities. The electroless process described above yields a uniform 2-4 micron nickel layer both inside the cavities and on the external faces of the substrate.

The nickel-plated substrate is washed with deionized water and then subjected to electrochemical cathode deposition. The electrochemical deposition process is carried out in an electrolytic bath comprising tetrathiomolybdate ($MoS_4^{2-}$) anions as the electroactive species. The bath is prepared by mixing aqueous solutions of $Na_2S$ and $Na_2MoO_4$ and adjusting the pH of the solution to a value in the range 7.5-8.0 by adding HCl or $KH_2PO_4$.

A flow control setup is used to ensure conformal deposition inside the high aspect ratio cavities. In this setup, the nickel-plated substrate is placed between two graphite plates acting as counter-electrodes. A peristaltic pump provides a constant flow rate of up to 0.4 L/min in the electrolytic bath. A thin film $MoS_2$ layer is obtained from electro-reduction of tetrathiomolybdate anions by applying a negative constant potential/current to the nickel-plated substrate.

In the present example, the HPE ion-conducting membrane comprises a commercially available PVDF-2801 copolymer (Kynar). $SiO_2$ (Aerosil 130) is added to the polymer matrix to enhance its ionic conductivity and electrolyte uptake. The PVDF powder is dissolved in high-purity cyclopentanone (Aldrich) or DMSO. Fumed silica 130 (Degussa) and propylene carbonate (PC, Merck) are then added, and the mixture is stirred at room temperature for approximately 24 hours to produce a homogeneous slurry.

Alternatively, PEGDME can be used as a pore former. The thickness of the membrane and its morphology depends on the amount of solids in the casting slurry and on the type of solvent and pore former used. The membrane slurry is inserted into the cavities using several sequential spin-coating and vacuum pulling steps.

Next, the anode material is prepared. MCMB 6-28 (mesocarbon microbeads, Osaka Gas Corporation) is used as the anode lithium intercalation host material. The MCMB is dried at 200° C. for approximately 8 hours. Anode slurry is prepared by mixing the appropriate amounts of MCMB, polymer binder and a solvent. The anode slurry is then pasted on the outer surface of the HPE membrane. A thin lithium film is applied with gentle pressure to the surface of the graphite anode to ensure intimate mating with the membrane. The lithiation of the graphite anode is preferably carried out within ten hours of the battery fabrication. The total electrode area of the microbattery is 0.2 $cm^2$.

The microbattery is then soaked in 1M $LiBF_4$ 1 EC: 9 DEC electrolyte under vacuum, in order to ensure complete wetting of the materials. The microbattery is hermetically sealed in a 2324 coin cell.

The $LiC_{6-x}$/HPE/$MoS_2$ cells were cycled at room temperature using a Maccor series 2000 battery test system. The voltage cut-off was in the range of 1.3-2.4V. The charge/discharge current density was 10 $\mu A/cm^2$. The cell delivered a capacity of 1.5 $mAh/cm^2$ per cycle for over 100 reversible cycles, with a capacity fading rate of 0.05%/cycle. The Faradaic efficiency was close to 100%.

Example 2

A 3-D microbattery is assembled similarly to example 1 above. In the present example, however, the cathode layer comprises a thicker, composite cathode. The composite $MoS_2$-based cathode is produced using an electrochemical deposition process, by adding PEGDME and PEO additives of different molecular weights and concentrations to the electrolytic bath.

Figure 5:
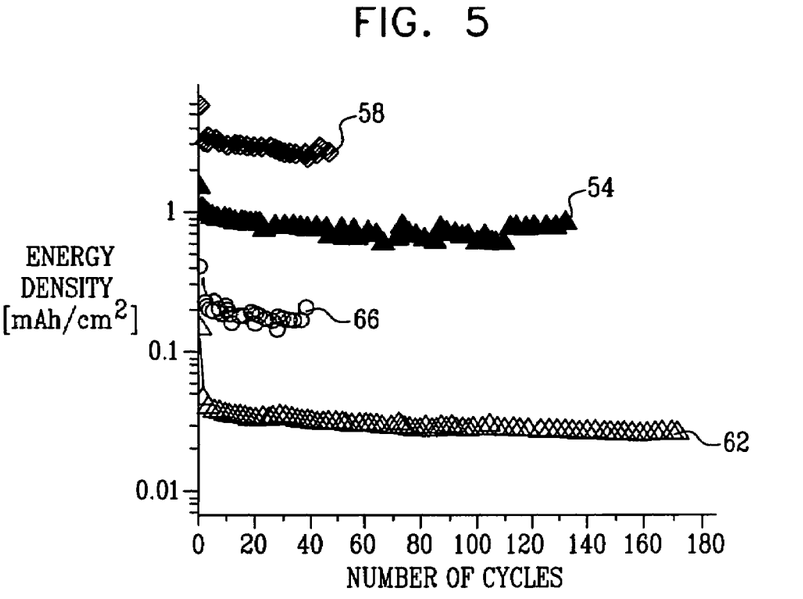
FIGS. 5 and 6 are graphs that show capacities of microbatteries, in accordance with embodiments of the present invention.

FIG. 5 is a graph showing a comparison between reversible capacities of 2-D and 3-D microbatteries having composite and pristine cathodes, in accordance with embodiments of the present invention. The graph shows the capacity (energy density in $mAh/cm^2$) as a function of the number of cycles for several exemplary microbatteries.

Data points 54 show the capacity of a 3-D microbattery, assembled in accordance with example 2, having a pristine cathode. The capacity of this battery is shown to begin at ~1.5 $mAh/cm^2$. Data points 58 show the capacity of a comparable size battery having a composite cathode. The capacity of this battery is shown to begin at ~3.5 $mAh/cm^2$. The additive-to-tetrathiomolybdate ratio and current density during the electrochemical deposition of a composite cathode significantly affects the reversible capacity of lithium and lithium-ion batteries. Data points 58 refer to a 1:1 polymer-to-salt ratio.

When producing the composite cathode, the current density used in the cathode deposition is doubled. The cathode deposition time also increases, typically from 0.5 to 2 hours. Composite cathode films are highly adherent to the substrate.

The capacities achieved by 3-D microbatteries are significantly larger than those achieved by comparable 2-D (planar) batteries. Data points 62 show the capacity of a 2-D thin-film battery having a pristine cathode and the same footprint as the 3-D microbatteries described above. Data points 66 show the capacity of a comparable 2-D battery having a composite cathode. As can be seen in the figure, the capacity of a 3-D microbattery is an order of magnitude larger than the capacity of a comparable 2-D battery.

Example 3

A 3-D microbattery is assembled similarly to example 2. In the present example, however, the composite cathode is deposited using an electrolyte having a 1:6 polymer-to-salt ratio at a current density of 20 mA/cm$^2$ for one hour.

Figure 6:
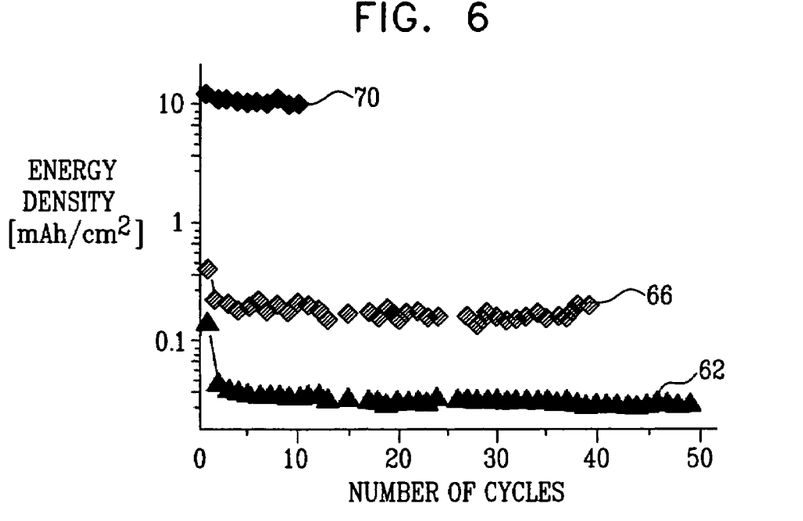

FIG. 6 is a graph showing a comparison between reversible capacities of 2-D and 3-D microbatteries having composite and pristine cathodes, in accordance with embodiments of the present invention. Data points 62 and 66 show the capacities of 2-D batteries having pristine and composite cathodes, respectively. Data points 70 show the capacity of the 3-D microbattery of example 3, whose composite cathode is deposited using an electrolyte having a 1:6 polymer-to-salt ratio. As can be seen in the figure, the reversible discharge capacity of the 3-D microbattery approaches 10 mAh/cm$^2$, almost two orders of magnitude larger than the capacity of a comparable 2-D battery.

Example 4

A 3-D microbattery is assembled similarly to examples 1 and 2. In the present example, however, the HPE membrane is cast only on one surface of the substrate. The resulting microbattery runs over 40 reversible cycles with a capacity loss of less than 0.1%/cycle. This example applies to both pristine and composite cathodes.

Example 5

A 3-D microbattery is assembled similarly to examples 1 and 2, with the HPE membrane cast on both surfaces of the MCP substrate. The cathode in this example comprises a composite cathode. The microbattery has a reversible capacity of approximately 5 mAh/cm$^2$ at room temperature.

Example 7

In order to avoid possible short circuits between the anode and cathode, an additional 10 micron layer of LiBF$_4$:P(EO)$_{20}$ polymer electrolyte can be applied by spin-coating to the two external faces of the MCP substrate, after the substrate had been coated with the nickel current collector and molybdenum oxysulfide cathode. Poly(ethylene oxide) (P(EO)) (Aldrich, average molecular weight 5×10$^6$) is vacuum-dried at 45-50° C. for approximately 24 hours. A polymer slurry is prepared by dispersing known quantities of P(EO) and LiBF$_4$, in analytical grade acetonitrile, together with the required amount of an inorganic filler, such as Al$_2$O$_3$ (Buehler) having an average diameter of approximately 150 Å. To ensure the formation of a homogeneous suspension, an ultrasonic bath or high-speed homogenizer can be used. The suspension is stirred for approximately 24 hours before the PE films are cast on the fine polished Teflon support (having a 64 cm$^2$ area). The solvent is allowed to evaporate slowly. The final thickness of the solvent-free PE films is in the range of 10-15 microns.

PVDF-SiO$_2$ membrane insertion is carried out using a casting process and vacuum filling steps as in example 1 above. In the resulting battery, the degree of capacity degradation does not exceed 0.5%/cycle (100% DOD) when the Li/PEO-PVDF)/MoO$_x$S$_y$ battery is cycled at a current density of 40 μA/cm$^2$ and a voltage cutoff in the range of 1.3-2.2V.

Example 8

A 3-D microbattery is assembled similarly to examples 1, 2 or 4. A Celgard 2400 separator is used as a polymer membrane. The resulting voltage cutoff is in the range of 1.3-2.4V. The charge/discharge current density is 40 μA/cm$^2$. The battery delivers a capacity of 4.5 mAh per cycle for over than 20 reversible cycles with a capacity fading rate of 0.06%/cycle. The Faradaic efficiency is close to 100%.

Example 9

A 3-D microbattery is assembled on a silicon substrate. The battery comprises a lithium-ion anode, HPE membrane and a MoS$_2$ cathode. In order to remove organic residues, the silicon substrate is immersed in an acetone and weak base solution for 5 minutes, and then washed in deionized water with successive immersion into a H$_2$O$_2$:HCl mixture for another 5 minutes. After rinsing in deionized water, the substrate is etched in a NH$_4$F:HF solution for 2 minutes, in order to roughen the silicon surface to increase the adherence of the current collector to the surface.

Molybdenum oxysulfide is deposited on the substrate similarly to example 2 above. A commercially available PVDF-2801 copolymer (Kynar) is used as a binder, and fumed silica is used as filler for the polymer membrane.

The battery is charged by a liquid LiImide-ethylene carbonate (EC):dimethyl carbonate (DMC) 1:1 (v/v) electrolyte. The resulting 3-D lithium-ion/hybrid polymer electrolyte/MoS$_2$ battery is cycled at room temperature using a Maccor series 2000 battery test system. The voltage cut-off is in the range of 1.2-2.3V. The charge/discharge current density is in the range of 10-100 μA/cm$^2$. The battery delivers a capacity of over 2 mAh per cycle at 40 μA/cm$^2$ for over 30 reversible cycles, with a capacity fading rate of 0.1%/cycle. The Faradaic efficiency is close to 100%.

In order to control the level of lithiation, the retained graphite flakes are filtered and washed with dry hexane. Distilled water is added slowly to the solution. A known volume of LiOH (in aqueous phase) is titrated with HCL. The calculated number of moles of LiOH is subtracted from the initial number moles of Li—NM, to give the actual number of moles of lithium intercalated.

Example 10

Several 3-D microbatteries having different electrochemically-deposited cathodes (CoO$_x$S$_y$, FeOxS$_{2-x}$, V$_2$O$_{5-x}$S$_x$ and Cu$_2$S) are fabricated and tested. A Li/HPE/Cu$_2$S 3-D microbattery having a 1 micron thick film cathode is assembled as described in example 1 above, starting with the following materials: 33 mg LiI, 216 mg P(EO), 41 mg EC, 100 mg Al$_2$O$_3$. A 100% dense Cu$_2$S cathode is prepared by anodic oxidation of a metallic copper layer electrodeposited on the electroless nickel (or gold). The electrolyte for copper electrodeposition contains (g/L): 200-250 CuSO$_4$x5H$_2$O and 50-60 $H_2SO_4$. The electrodeposition is performed at room temperature and a current density of 50 mA/cm² for 8 minutes. The copper layer is electro-oxidized in an aqueous solution of polysulfides (a mixture of 10 mM $Na_2S$, 0.1 M NaOH and elemental sulfur) at a constant current of 0.1-0.5 mA/cm² for several seconds. The degree of capacity degradation of the resulting lithium-ion/HPE/$Cu_2S$ microbattery does not exceed 1.5%/cycle.

Although the methods and devices described herein mainly address the fabrication of 3-D microbatteries, the principles of the present invention can also be used to fabricate other energy storage devices, such as double-layer capacitors (DLC) and other capacitor types.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. An electrical energy storage device, comprising:
   a substrate having an outer surface and having a plurality of cavities communicating with the outer surface, the cavities having interior cavity surfaces;
   a first electrode layer deposited at least over the interior cavity surfaces;
   an electrolyte separator layer formed over the first electrode layer so as to fill the cavities and to extend over the outer surface of the planar substrate; and
   a second electrode layer formed over the electrolyte separator layer on the outer surface of the planar substrate.

2. The device according to claim 1, wherein the substrate has at least one of a planar and a spherical shape.

3. The device according to claim 1, wherein the substrate comprises at least one of a perforated plate and a microchannel plate (MCP).

4. The device according to claim 1, wherein the substrate has two opposite outer surfaces, wherein the cavities comprise through cavities communicating with the two outer surfaces, wherein the electrolyte separator layer extends over the two outer surfaces, and wherein the second electrode layer is formed over the electrolyte separator layer on the two opposite outer surfaces.

5. The device according to claim 1, wherein the substrate comprises at least one of a semiconductor, a glass, a plastic, a metal, an alloy, carbon and a composite material.

6. The device according to claim 1, wherein a ratio of a height of the cavities divided by a width of the cavities is greater than unity.

7. The device according to claim 1, further comprising a first hollow current collector layer coating at least part of the substrate and deposited between the interior cavity surfaces of the substrate and the first electrode layer.

8. The device according to claim 1, further comprising a second current collector layer formed over the second electrode layer.

9. The device according to claim 1, wherein one of the first and second electrode layers comprises a cathode of the device, and wherein the other of the first and second electrode layer comprises an anode of the device.

10. The device according to claim 9, wherein the cathode comprises at least one of molybdenum oxysulfide ($MoS_2$), FeS, $FeS_2$, $WS_2$, $LiCoO_2$, $LiNiO_2$, $LiMn_2O_4$, CuS, $CuS_2$, $TiS_2$, $V_2O_5$, $V_3O_8$, $Li_{1+x}Mn_{2-y}O_4$, $MoO_2$, $MoO_3$, CoO and $Fe_xMo_ySO$.

11. The device according to claim 9, wherein the cathode comprises a composite cathode having a polymer added thereto.

12. The device according to claim 9, wherein the anode comprises at least one of graphite, an alkali metal and an alkali metal alloy.

13. The device according to claim 1, wherein the electrolyte separator layer comprises at least one of a hybrid polymer electrolyte (HPE) membrane, a gel electrolyte, a solid ceramic electrolyte and a solid polymer electrolyte.

14. A method for constructing an electrical energy storage device, comprising:
   providing a substrate having an outer surface and having a plurality of cavities communicating with the outer surface, the cavities having interior cavity surfaces;
   depositing a first electrode layer at least over the interior cavity surfaces;
   forming an electrolyte separator layer over the first electrode layer so as to fill the cavities and to extend over the outer surface of the planar substrate; and
   forming a second electrode layer over the electrolyte separator layer on the outer surface of the planar substrate.

15. The method according to claim 14, wherein the substrate has at least one of a planar and a spherical shape.

16. The method according to claim 14, wherein providing the substrate comprises at least one of providing a perforated plate and providing a microchannel plate (MCP).

17. The method according to claim 14, wherein the substrate has two opposite outer surfaces, wherein the cavities comprise through cavities communicating with the two outer surfaces, wherein forming the electrolyte separator layer comprises extending the electrolyte layer over the two outer surfaces, and wherein forming the second electrode layer comprises applying the second electrode layer over the electrolyte separator layer on the two opposite outer surfaces.

18. The method according to claim 14, wherein the substrate comprises at least one of a semiconductor, a glass, a plastic, a metal, an alloy, carbon and a composite material.

19. The method according to claim 14, wherein a ratio of a height of the cavities divided by a width of the cavities is greater than unity.

20. The method according to claim 14, further comprising depositing a first hollow current collector layer so as to coat at least part of the substrate between the interior cavity surfaces of the substrate and the first electrode layer.

21. The method according to claim 14, further comprising forming a second current collector layer over the second electrode layer.

22. The method according to claim 14, wherein one of the first and second electrode layers comprises a cathode of the device, and wherein the other of the first and second electrode layer comprises an anode of the device.

23. The method according to claim 22, wherein the cathode comprises at least one of molybdenum oxysulfide ($MoS_2$), FeS, $FeS_2$, $WS_2$, $LiCoO_2$, $LiNiO_2$, $LiMn_2O_4$, CuS, $CuS_2$, $TiS_2$, $V_2O_5$, $V_3O_8$, $Li_{1+x}Mn_{2-y}O_4$, $MoO_2$, $MoO_3$, CoO and $Fe_xMo_ySO$.

24. The method according to claim 22, and comprising adding a polymer to the cathode so as to produce a composite cathode.

25. The method according to claim 22, wherein the anode comprises at least one of graphite, an alkali metal and an alkali metal alloy.

26. The method according to claim 14, wherein the electrolyte separator layer comprises at least one of a hybrid polymer electrolyte (HPE) membrane, a gel electrolyte, a solid ceramic electrolyte and a solid polymer electrolyte.

27. The method according to claim 14, wherein depositing the first electrode layer comprises applying at last one of an electrochemical deposition process, an electroless deposition process and a chemical vapor deposition process.

28. The method according to claim 14, wherein forming the electrolyte separator layer comprises inserting the electrolyte layer into the cavities using at least one of a spin-coating process, a vacuum-assisted pulling process, a pasting process, a pressure-filling process and a casting process.

* * * * *

UNITED STATES PATENT AND TRADEMARK OFFICE
CERTIFICATE OF CORRECTION

PATENT NO. : 7,618,748 B2 Page 1 of 1
APPLICATION NO. : 11/374469
DATED : November 17, 2009
INVENTOR(S) : Nathan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Fourteenth Day of December, 2010

David J. Kappos
*Director of the United States Patent and Trademark Office*